UNITED STATES PATENT OFFICE 2,182,086

COLLOIDAL MINERAL MATTER

Charles E. Kraus, Sparks, Md.

No Drawing. Application July 13, 1937,
Serial No. 153,380

5 Claims. (Cl. 252—6)

Mineral matter having colloidal properties have many uses in the arts, and many attempts to produce such matter by mechanical means have met with slight success.

By the process of this invention colloidal mineral matter having a range of particle size from 0.1 micron to 5.0 microns, with its major portion between 1.0 and 0.1 microns may be produced.

Colloidal mineral matter produced according to this invention is useful as a ceramic bond, as an emulsifying agent and as a plasticizing agent, and as a dispersing agent, and it increases the plastic flow of viscous solutions, such as glue, silicate of soda, and other products. It is an excellent dispersing agent for rubber and rubber latex. Its melting point is over 3000° F.

For instance when 10% by dry weight is added to clay the bonding strength of the clay is increased to from 100 to 200% or more.

When added to silicate of soda, or glue, it increases the adhesiveness of the adhesives.

The colloidal mineral matter of this invention has high thixotropic tendencies and although it has low adhesive strength, it increases the adhesiveness of adhesives due to its thixotropic behavior which causes the adhesives to flow more freely when in motion, such as motion by brushing or when agitated.

The colloidal mineral matter of this invention is unlike bentonite in that it is of the irreversible type while bentonite is of the reversible type.

The mineral matter involved in the process of this invention must be; first, of the aluminum silicate group; second, it must be naturally impregnated with mineral oil; and third, it must be amorphous in character. It may be described as an oil-impregnated, amorphous, argillaceous mineral matter having for its main constituents, alumina and silica. It occurs infrequently in the natural state.

This material does not assume colloidal properties when simply boiled in water, or ground in water, but when treated by the method of this invention, it does assume such properties and the particles of the mass have the size above set forth.

Many clay-like substances containing more or less dried colloids, assume colloidal properties to a small degree under various treatments. An amorphous mineral matter having as it main constituents alumina and silica and being naturally impregnated with what appears to be emulsified mineral oil, has been discovered; which, it is believed, contains colloids that are prevented from manifesting their colloidal properties because of the presence of the oil.

In accordance with this invention an agent, in solution, and with heat applied acts upon the oil to dislodge it from the colloids in the mineral matter and results in a jelly-like mass having the particle size above described. The agent may be acid, such as sulphuric, hydrochloric, acetic, or others, or it may be a solution of a salt, such as sodium chloride, aluminum sulphate, aluminum chloride, or others or it may have an alkaline reaction such as sodium oxalate, sodium acetate, ammonium hydroxide, or others.

This invention does not involve the dissolving or digesting of aluminum silicate mineral matter by treating with an acid or alkaline solution, as heretofore practiced, but rather the freeing of the natural colloid by dislodging the oil from it.

A typical example of bringing out the colloidal properties of the natural mineral matter, according to this invention, is as follows:

An alkaline solution composed of approximately 1 part ammonium hydroxide (28% solution) and 20 parts of water are heated to about 190° F.; 24 parts of the natural mineral matter as described are added and agitated either slowly or rapidly until the entire mass reaches a liquid or pasty state. It is then discharged and assumes a jelly-like colloidal condition upon cooling and is of a particle size as previously described.

The colloidal substance thus produced may be neutralized, or acidified with an acid solution without destroying its colloidal properties; or the natural mineral matter can be treated first with a salt solution with acid reaction and neutralized or alkalized with an alkaline solution. A typical example of this procedure is as follows:

A salt solution composed of approximately 1 part aluminum sulphate, 40 parts of water, with acid reaction, are heated to about 190° F.; 50 parts of the natural mineral matter as described are added and agitated until the mass reaches a liquid or pasty state; it is then neutralized or alkalinized with an alkaline solution. The procedure and proportions for carrying out the invention with an acid are substantially the same as in the above example.

For some future uses the colloidal product is desired to have an acid reaction, for others, an alkaline, and yet for others, a neutral reaction, and by the above methods, any desired final reaction product may be produced.

Now having fully described the invention, what is claimed as new and desired to be secured by Letters Patent is:

1. The process of preparing a jellylike oil and water colloidal suspension of aluminum silicate comprising agitating together a naturally occurring colloidal amorphous aluminum silicate naturally impregnated with mineral oil, in which the colloidal properties of the aluminum silicate are masked and the mass cannot be deflocculated by mechanical grinding in water, with an aqueous solution of an electrolyte at a temperature of the order of 190° F., modifying the natural association of the oil and aluminum silicate so that on cooling the mixture assumes a jellylike form.

2. The process of preparing a jellylike oil and water colloidal suspension of aluminum silicate comprising agitating together a naturally occurring colloidal amorphous aluminum silicate naturally impregnated with mineral oil, in which the colloidal properties of the aluminum silicate are masked and the mass cannot be deflocculated by mechanical grinding in water, with an aqueous solution of an electrolyte selected from the group consisting of acids and alkalies at a temperature of the order of 190° F., modifying the natural association of the oil and the aluminum silicate so that on cooling the mixture assumes a jellylike form and neutralizing the product with other members of said group.

3. The process of preparing a jellylike oil and water colloidal suspension of aluminum silicate comprising agitating together a naturally occurring colloidal amorphous aluminum silicate naturally impregnated with mineral oil, in which the colloidal properties of the aluminum silicate are masked and the mass cannot be deflocculated by mechanical grinding in water, with an aqueous solution of an electrolyte at a temperature of the order of 190° F., modifying the natural association of the oil and the aluminum silicate so that on cooling the mixture assumes a jellylike form which when dried is irreversible.

4. The process of preparing a jellylike oil and water colloidal suspension of aluminum silicate comprising agitating together a naturally occurring colloidal amorphous aluminum silicate naturally impregnated with mineral oil, in which the colloidal properties of the aluminum silicate are masked and the mass cannot be deflocculated by mechanical grinding in water, with an aqueous solution of an electrolyte at a temperature of the order of 190° F., modifying the natural association of the oil and the aluminum silicate so that on cooling the mixture assumes a jellylike form, having a melting point when dry of not less than 3000° F., and which is then irreversible.

5. A jellylike oil and water colloidal suspension of aluminum silicate produced by agitating together naturally occurring colloidal amorphous aluminum silicate naturally impregnated with mineral oil, in which the colloidal properties of the aluminum silicate are masked and the mass cannot be deflocculated by mechanical grinding in water, with an aqueous solution of an electrolyte at a temperature of the order of 190° F., modifying the natural association of the oil and aluminum silicate so that the reaction mixture assumes a jellylike form on cooling, and cooling the mixture.

CHARLES E. KRAUS.